United States Patent [19]
Sashida et al.

[11] Patent Number: 5,189,603
[45] Date of Patent: Feb. 23, 1993

[54] DC TO AC ELECTRIC POWER CONVERTING APPARATUS

[75] Inventors: Nobuo Sashida; Kazunori Sanada, both of Kobe; Masato Koyama, Amagasaki, all of Japan

[73] Assignee: Mitsubishi Denki Kabushiki Kaisha, Tokyo, Japan

[21] Appl. No.: 756,426

[22] Filed: Sep. 9, 1991

[30] Foreign Application Priority Data

Sep. 10, 1990 [JP] Japan .................. 2-240951

[51] Int. Cl.$^5$ ............................ H02M 5/22
[52] U.S. Cl. ................... 363/160; 363/131; 363/159; 363/163
[58] Field of Search ........ 363/15, 17, 37, 41, 363/95, 98, 127, 128, 131, 132, 159, 160, 163, 161

[56] References Cited

U.S. PATENT DOCUMENTS

| | | |
|---|---|---|
| 3,487,289 | 12/1969 | McMurray . |
| 3,742,336 | 6/1973 | Bedford . |
| 4,240,135 | 12/1980 | Schaefer, III .......... 363/161 X |
| 4,479,175 | 10/1984 | Gille et al. . |
| 4,556,937 | 12/1985 | Ziogas et al. .............. 363/8 |
| 4,639,850 | 1/1987 | Asaeda et al. . |
| 4,652,770 | 3/1987 | Kumano . |
| 4,677,537 | 6/1987 | Chonan . |
| 4,706,178 | 11/1987 | Hayashi . |
| 4,847,744 | 7/1989 | Araki . |
| 4,855,887 | 8/1989 | Yamato et al. . |
| 4,878,163 | 10/1989 | Yamato et al. . |
| 4,969,080 | 11/1990 | Kawabata et al. . |

OTHER PUBLICATIONS

"New Conversion System for UPS Using High Frequency Link"; PESC, '88 Record: Apr. 1988.
"High Frequency Link DC/AC Converter with PWM Cycloconver"; IEEE Catalog No. 90CH2935-5; Conference Record of the 1990 IEEE Industry Applications Society Annual Meeting; pp. 1119-1124.
"High Frequency Link DC-AC Converter for UPS with a New Voltage Clamper"; 21st Annual IEEE Power Electronics Specialists Conference; pp. 749-756; 1990.
"A Control Method for a High Frequency Link Inverter Using Cycloconverter Techniques"; Muroyama et al.; INTELEC 89: Oct. 15-18, 1989; pp. 1-6.
"Instantaneous Voltage Control-Based Sinusoidal CVCF Inverter with High-Frequency Resonant AC Link and its UPS System Application"; European Conference on Power Electronics and Applications; vol. 1; Oct. 9-12, 1989; pp. 342-346.

Primary Examiner—Emanuel T. Voeltz
Attorney, Agent, or Firm—Leydig, Voit & Mayer

[57] ABSTRACT

A DC-to-AC electric power converting apparatus including an invertor circuit having a plurality of switching elements, a transformer connected to the invertor circuit, and a cyclo-converter circuit for converting the frequency of the output from the transformer. A carrier signal generator is provided for generating a carrier signal of a predetermined frequency. An invertor switching circuit for controlling the switching operation of a plurality of the switching elements of the invertor circuit in synchronization with the carrier signal and switching a plurality of the switching elements of the invertor circuit in a period in which an electric current is not substantially passed through the invertor circuit; a reference voltage signal generating circuit for generating a reference voltage signal for the AC voltage to be transmitted from the cyclo-converter circuit; and a switching signal generating circuit for generating a control signal for controlling the cyclo-converter circuit in response to the reference voltage signal generated by the reference voltage signal generating circuit and the carrier signal generated by the carrier signal generator.

9 Claims, 14 Drawing Sheets

DC TO AC ELECTRIC POWER CONVERTING APPARATUS

BACKGROUND OF THE INVENTION

1. Field of the Invention

The present invention relates to a DC-to-AC electric power converting apparatus for use in an AC power supply system such as an uninterruptive power supply system. More particularly, the present invention relates to an electric power converting apparatus of a high frequency intermediate link system in which high frequency electric power is transmitted/received via an insulating transformer.

2. Description of the Related Art

The structure of a conventional apparatus will be described with reference to FIG. 15. FIG. 15 is a block diagram of a conventional DC-to-Ac power converting apparatus as disclosed in IEEE PESC '88 Record, pp 658-663, 1988. Referring to the drawing, reference numeral 1 represents an inverter circuit, 2 represents a transformer the input of which is connected to the inverter circuit 1 and 3 represents a cyclo-converter circuit connected to the output of the transformer 2. Reference numeral 4 represents a filter circuit connected to the output of the cyclo-converter circuit 3 and 5 represents a current detector for detecting the output current from the cyclo-converter circuit 3. Reference numeral 6 represents a carrier signal generator, 7 represents a reference voltage signal generating circuit and 8 represents an absolute circuit. Reference numeral 9 represents a PWM circuit, 10 represents an inverter switching circuit and 11 represents a cyclo-converter switching circuit. The inverter circuit 1 comprises four semiconductor switching devices $S_1$ to $S_4$, while the cyclo-converter circuit 3 comprises four semiconductor switching devices $S_5$, $S_6$, $S_{5A}$ and $S_{6A}$. The transformer 2 is arranged in such a manner that the turn ratio of the primary coil and the secondary coil is 1:2 and an intermediate tap is formed at the midpoint of the secondary coil. The filter circuit 4 is an LC filter circuit comprising a reactor and a capacitor. Reference numerals 12 and 13 respectively represent a DC power source and a load circuit connected to the DC-to-AC electric power converting apparatus.

Then, the operation of the above-described conventional apparatus will be described with reference to FIG. 16. As shown in the uppermost portion of FIG. 16, reference voltage signal V* in the sine waveform transmitted from the reference voltage signal generating circuit 7 is converted into absolute signal |V*| by the absolute circuit 8. The absolute signal |V*| is, together with a carrier signal transmitted from the carrier signal generator 6, supplied to the PWM circuit 9. As a result, the PWM circuit 9 transmits two types binary signals $T_a$ and $T_b$. That is, the binary signal $T_a$, the level of which is changed in synchronization with the timing at which the amplitude of the absolute signal |V*| and that of the carrier signal are allowed to coincide with each other, and the binary signal $T_b$, the level of which is changed in synchronization with the last transition of the carrier signal, are transmitted. Then, the binary signal $T_a$ and $T_b$ are supplied to the inverter switching circuit 10 so that ON/OFF signals $T_1$ to $T_4$ for switching on/off the four semiconductor switching devices $S_1$ to $S_4$ constituting the inverter circuit 1 are transmitted. That is, the ON/OFF signals $T_1$ and $T_3$ are the same as the binary signals $T_b$ and $T_a$, respectively. The ON/OFF signals $T_2$ and $T_4$ are the signals obtained by respectively inverting the sign of the binary signals $T_b$ and $T_a$. When the level of the ON/OFF signals $T_1$ to $T_4$ is high, the corresponding semiconductor switching devices $S_1$ to $S_4$ are switched on. When the same is low, the corresponding semiconductor switching devices $S_1$ to $S_4$ are switched off. As a result of the structure shown in FIG. 15, the relationships among the semiconductor switching devices $S_1$ to $S_4$ and the secondary voltage $V_2$ of the transformer 2 are expressed as follows:

When the switches $S_1$ and $S_3$ are switched on: $V_2=0$

When the switches $S_1$ and $S_4$ are switched on:
$V_2=V_{dc}$

When the switches $S_2$ and $S_3$ are switched on:
$V_2=-V_{dc}$

When the switches $S_2$ and $S_4$ are switched on: $V_2=0$    (1)

where symbol $V_{dc}$ denotes the DC output voltage from the DC power source 12.

Therefore, when the semiconductor switching devices $S_1$ to $S_4$ constituting the inverter circuit 1 are switched on/off in response to the ON/OFF signals $T_1$ to $T_4$, $V_2$ becomes AC voltage the pulse width of which has been modulated as shown in FIG. 16.

When the binary signal $T_b$, the reference voltage signal V* and output current $i_{cc}$ from the cyclo-converter circuit 3 transmitted from the current detector 5 are supplied to the cyclo-converter switching circuit 11, ON/OFF signals $T_5$, $T_6$, $T_{5A}$ and $T_{6A}$ for respectively switching on/off the four semiconductor switching devices $S_5$, $S_6$, $S_{5A}$ and $S_{6A}$ constituting the cyclo-converter circuit 3 are transmitted from the cyclo-converter switching circuit 11. It is assumed that the polarity of the output current $i_{cc}$ is defined in such a manner that the direction, in which the output current $i_{cc}$ is supplied to the load circuit 13, is positive. When the polarity of the $i_{cc}$ is positive, the semiconductor switching device $S_5$ or $S_6$ is switched on/off. When the same is negative, $S_{5A}$ or $S_{6A}$ is switched on/off.

As a result of the structure arranged as shown in FIG. 15, the relationship between the output voltage $V_{cc}$ from the cyclo-converter circuit 3 and the secondary voltage $V_2$ of the transformer 2 is expressed as follows:

When $S_5$ or $S_{5A}$ is switched on: $V_{cc}=V_2$

When $S_6$ or $S_{6A}$ is switched on: $V_{cc}=-V_2$    (2)

Therefore, when the ON/OFF signal $T_5$ or $T_{5A}$ is made the same as the binary signal $T_b$ and as well the ON/OFF signal $T_6$ or $T_{6A}$ is made the signal formed by inverting the sign of the binary signal $T_b$, the polarity of $V_{cc}$ becomes positive. When the ON/OFF signal $T_5$ or $T_{5a}$ is made the signal formed by inverting the sign of the binary signal $T_b$ and as well the ON/OFF signal $T_6$ or $T_{6A}$ is made the same as the binary signal $T_b$, the polarity of $V_{cc}$ becomes negative. As a result, the cyclo-converter switching circuit 11 discriminates the polarity of the reference voltage signal V* and the output current $i_{cc}$ from the cyclo-converter circuit 3 respectively supplied from the reference voltage signal generating circuit 7 and the current detector 5. Thus, the ON/OFF signals $T_5$, $T_6$, $T_{5A}$ and $T_{6A}$ as shown in FIG. 16 are generated from the binary signal $T_b$ supplied from the PWM circuit 9 in accordance with the thus discriminated polarity. In accordance with this, sine-wave voltage, the pulse width of which has been modulated and which is as shown in the lowermost portion of FIG. 16, can be obtained as the output voltage $V_{cc}$ from the cyclo-converter 3. When the obtained output voltage $V_{cc}$ is then supplied to the filter circuit 4, sine-wave voltage $V_L$ from which the high frequency component has been eliminated due to the PWM operation is supplied to the load circuit 13. When the frequency of the carrier signal is raised sufficiently with respect to the frequency of the reference voltage signal $V^*$ at this time, the load voltage $V_L$ to be supplied to the load circuit 13 becomes the voltage from which the high frequency component has been sufficiently removed due to the PWM operation and the amplitude and the phase thereof have been made substantially the same as those of the reference voltage signal $V^*$. FIG. 16 illustrates a switching pattern when the load circuit 13 has been made the linear load of the delay power factor.

Then, electric currents which respectively pass through each of the switching elements of the inverter circuit 1 and the cyclo-converter circuit 3 will now be considered. Since the electric current output from the cyclo-converter 3 continuously passes, the electric current is not turned on/off at the moment at which each of the switching elements is switched off. As a result, it commutates to another switching element which is switched on. In the cyclo-converter circuit 3, since a pair is formed by the switches $S_5$ and $S_6$ and another pair is formed by the switches $S_{5A}$ and $S_{6A}$, the electric current is complementarily commutates to each other. For example, when the switch $S_5$ switches off the electric current, the current commutates to the switch $S_6$ which is switched on. On the contrary, when the switch $S_{5A}$ switches off the electric current, the current commutates to the switch $S_{6A}$. In the inverter circuit 1, the electric current circulates in the inverter circuit 1 when $V_2=0$ in Equation (1). On the contrary, the electric current passes through the DC power source 12 when $V_2=V_{dc}$ or $-V_{dc}$. For example, when the switch $S_4$ switches off the electric current in a state where the electric current passes because the switches $S_1$ and $S_4$ are switched on, the electric current commutates to the switch $S_3$ which is switched on.

As described above, the conventional DC-to-AC electric power converting apparatus receives DC electric power and transmits AC electric power in accordance to the reference voltage signal. The above-described DC-to-AC electric power converting apparatus is usually called "a high frequency intermediate link type electric power converting apparatus" since the high frequency electric power is supplied/received via a transformer. There has been known a fact that a structure, in which the high frequency intermediate link type electric power converting apparatus is employed in an AC power source apparatus such as the uninterruptive power supply system, will enable the size and the weight of the insulating transformer and the filter circuit to be reduced.

However, the conventional DC/AC power converting apparatus encounters problems in that the conversion efficiency is unsatisfactory and the switching frequency cannot be raised due to large switching loss generated because the switching elements of the inverter circuit and the cyclo-converter circuit switch the electric current on and off. Furthermore, there arises another problem of generating voltage surge due to switching.

SUMMARY OF THE INVENTION

Accordingly, an object of the present invention is to provide DC/AC power converting apparatus exhibiting small switching loss, high conversion efficiency and reduced voltage surge.

According to the present invention, there is provided a DC-to-AC electric power converting apparatus comprising: an inverter circuit having a plurality of switching elements and converting DC electric power into AC electric power; a transformer connected to the inverter circuit; a cyclo-converter circuit for converting the frequency of the output from the transformer; a carrier signal generator for generating a carrier signal of a predetermined frequency; an inverter switching circuit for controlling the switching operation of a plurality of the switching elements of the inverter circuit in synchronization with the carrier signal and switching a plurality of the switching elements of the inverter circuit in a period in which an electric current is not substantially passed through the inverter circuit; a reference voltage signal generating circuit for generating a reference voltage signal for the AC voltage to be transmitted from the cyclo-converter circuit; and a switching signal generating circuit for generating a control signal for controlling the cyclo-converter circuit in response to the reference voltage signal generated by the reference voltage signal generating circuit and the carrier signal generated by the carrier signal generator.

Other and further objects, features and advantages of the invention will be appear more fully from the following description.

DESCRIPTION OF THE PREFERRED EMBODIMENTS

Preferred embodiments of the present invention will now be described with reference to the drawings.

Figure 1:
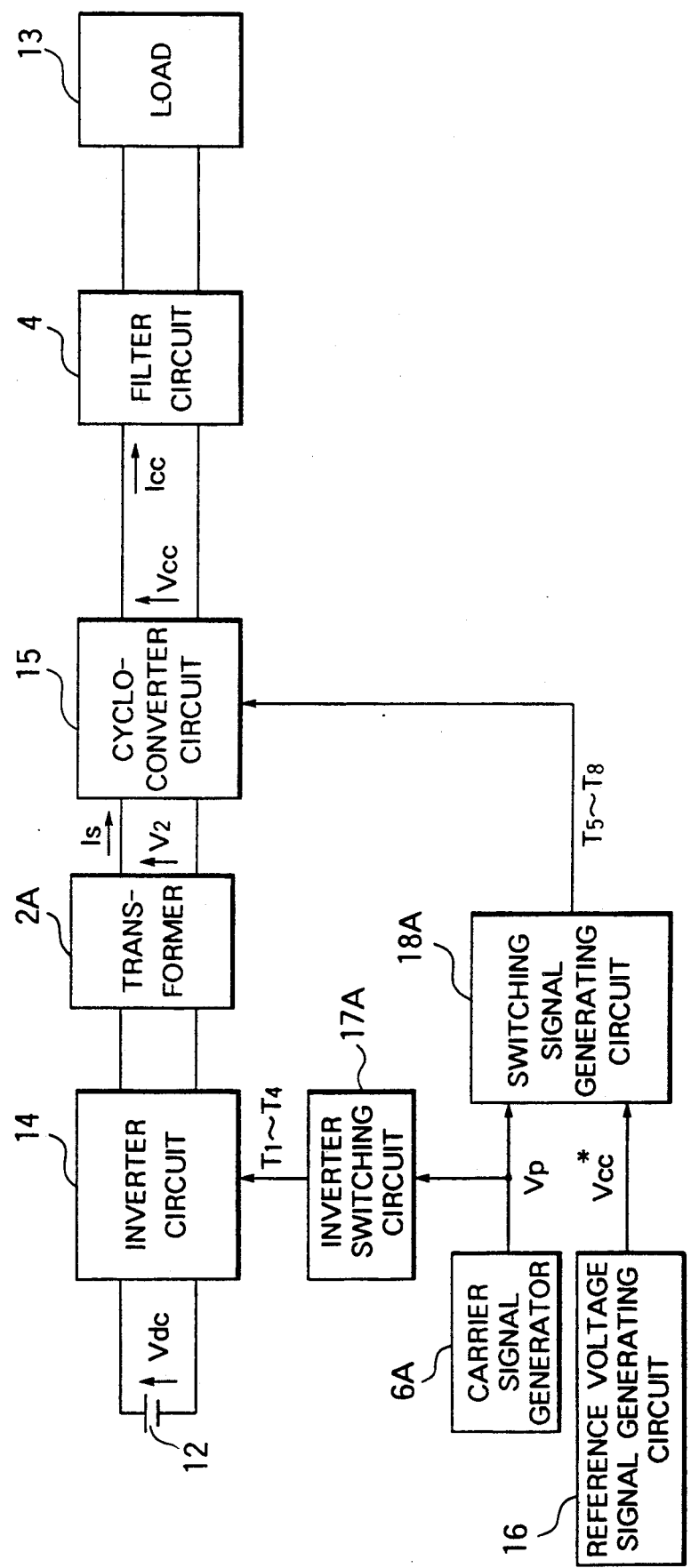
FIG. 1 is a block diagram which illustrates a first embodiment of the present invention.

FIGS. 1 to 5 illustrate a first embodiment of the present invention, where FIG. 1 illustrates the structure of the first embodiment. Referring to FIG. 1, reference numeral 2A represents a transformer, 6A represents a carrier signal generator, 14 represents an inverter circuit and 15 represents a cyclo-converter circuit. Reference numeral 16 represents a reference voltage signal generating circuit and 17A represents an inverter switching circuit. Reference numeral 18A represents a switching signal generating circuit. The filter circuit 4, the DC power source 12 and the load circuit 13 are the same as those for the conventional structure.

Figure 2:
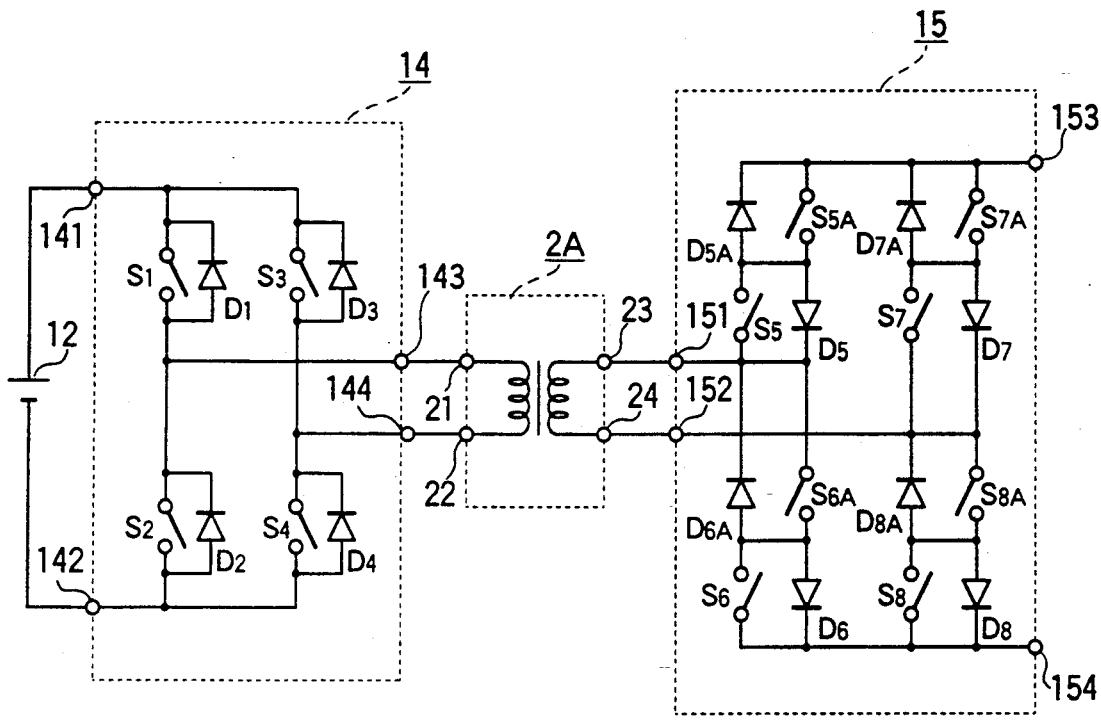
FIG. 2 is a block diagram which illustrates an inverter circuit, a transformer and a cyclo-converter circuit according to the first embodiment.

FIG. 2 illustrates the detailed structure of each of the inverter circuit 14, the transformer 2A and the cyclo-converter circuit 15. The inverter circuit 14 comprises input terminals 141 and 142 connected to the DC power source 12, semiconductor switching devices $S_1$ to $S_4$ such as transistors and MOSFETs, diodes $D_1$ to $D_4$ connected to the respective switching devices $S_1$ to $S_4$ in an inverted parallel manner and output terminals 143 and 144. The transformer 2A comprises primary coil terminals 21 and 22 connected to the output terminals 143 and 144 of the inverter circuit 14 and secondary coil terminals 23 and 24, the transformer 2A having a transformation ratio of 1:1. The cyclo-converter circuit 15 comprises input terminals 151 and 152 connected to the secondary coil terminals 23 and 24 of the transformer 2A, semiconductor switching devices $S_5$ to $S_8$ and $S_{5A}$ to $S_{8A}$ such as transistors and MOSFETs, diodes $D_5$ to $D_8$ and $D_{5A}$ to $D_{8A}$ connected to the above-described switching devices $S_5$ to $S_8$ and $S_{5A}$ to $S_{8A}$ in an inverted parallel manner and output terminals 153 and 154 connected to the filter circuit 4. The above-described two semiconductor switching devices $S_n$ and $S_{nA}$ (n=5 to 8) and diodes $D_n$ and $D_{nA}$ (n=5 to 8) connected to the two semiconductor switching devices $S_n$ and $S_{nA}$ (n=5 to 8) constitute bidirectional switches each of which is arranged in such a manner that the direction, through which electric power is supplied, can be controlled.

Figure 3:
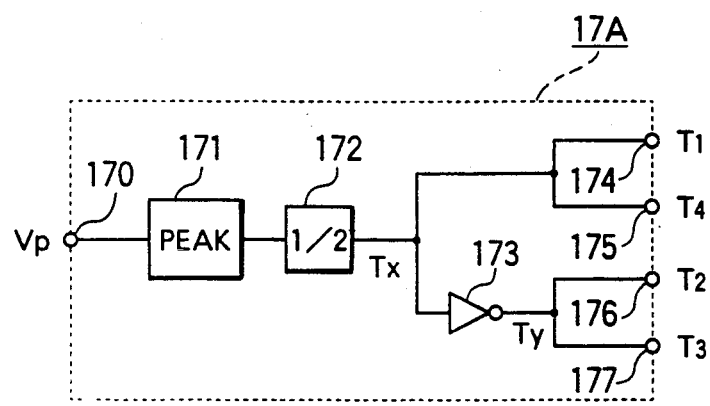
FIG. 3 is a block diagram which illustrates an inverter switching circuit according to the first embodiment.

FIG. 3 illustrates the detailed structure of the inverter switching circuit 17A which comprises an input terminal 170 connected to the carrier signal generator 6A, a peak detecting circuit 171 for detecting the peak of the signal supplied to the input terminal 170, a ½ divider 172 the polarity of the output signal from which is inverted in synchronization with the output from the peak detecting circuit 171, NOT circuit 173 connected to the ½ divider 172 and output terminals 174 to 177.

Figure 4:
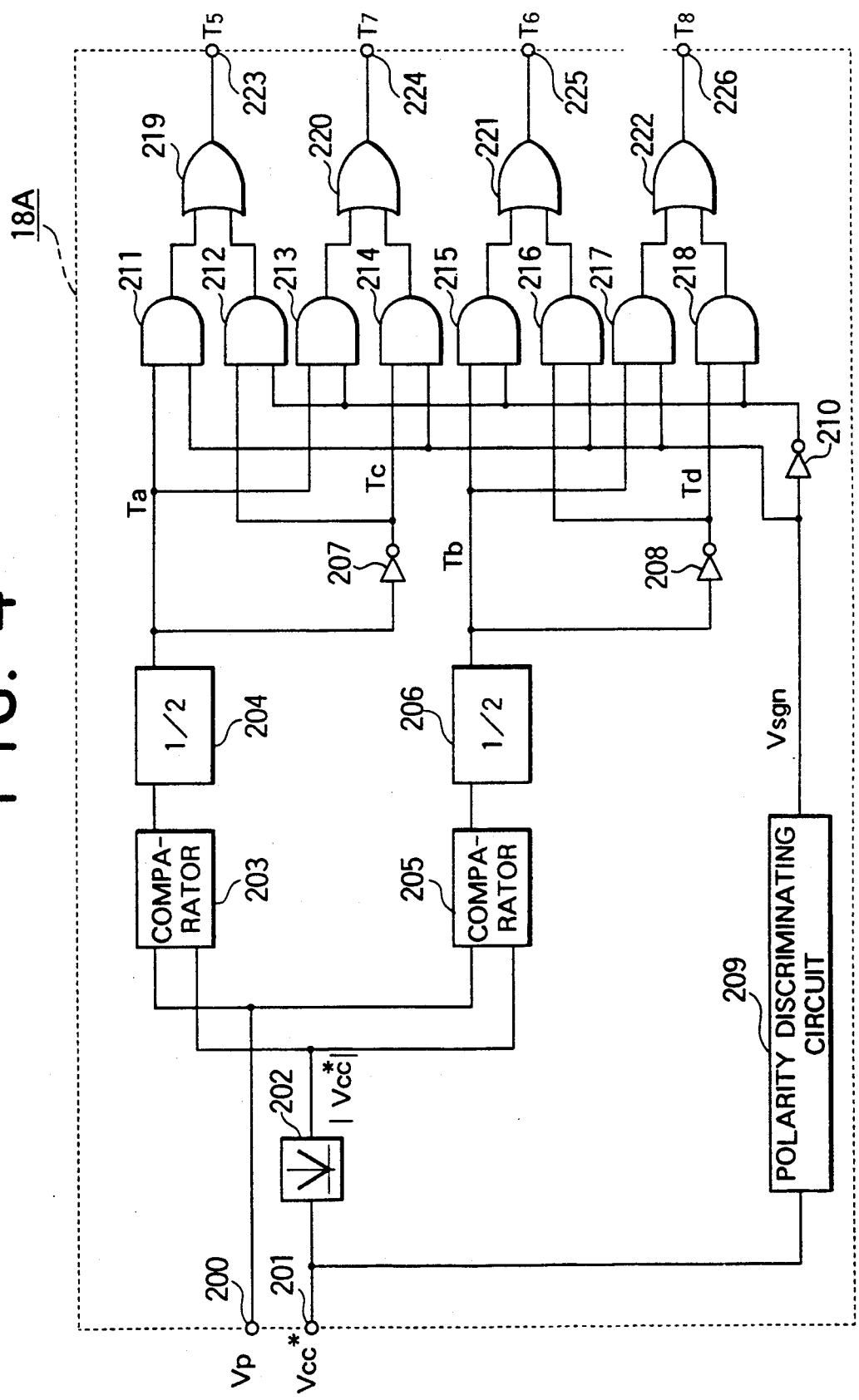
FIG. 4 is a block diagram which illustrates a switching signal generating circuit according to the first embodiment.

FIG. 4 illustrates the detailed structure of the switching signal generating circuit 18A which comprises an input terminal 200 connected to the carrier signal generator 6A, an input terminal 201 connected to the reference voltage signal generating circuit 16. An absolute circuit 202 is provided the output of which is connected to a comparator 203 constituted in such a manner which transmits an output signal having a narrow width at an intersection between the last transition slope of the carrier signal $V_p$ and the reference voltage signal $|V_{cc}^*|$. Also provided is a comparator 205 transmits an output signal having a narrow width at an intersection between the first transition slope of the carrier signal $V_p$ and the reference voltage signal $|V_{cc}^*|$, NOT circuits 207, 208 and 210, ½ dividers 204 and 206 the polarity of the output from which is inverted in synchronization with the last transition of the input signal, a polarity discriminating circuit 209, AND circuits 211 to 218, OR circuits 219 to 222 and output terminals 223 to 226.

Figure 5:
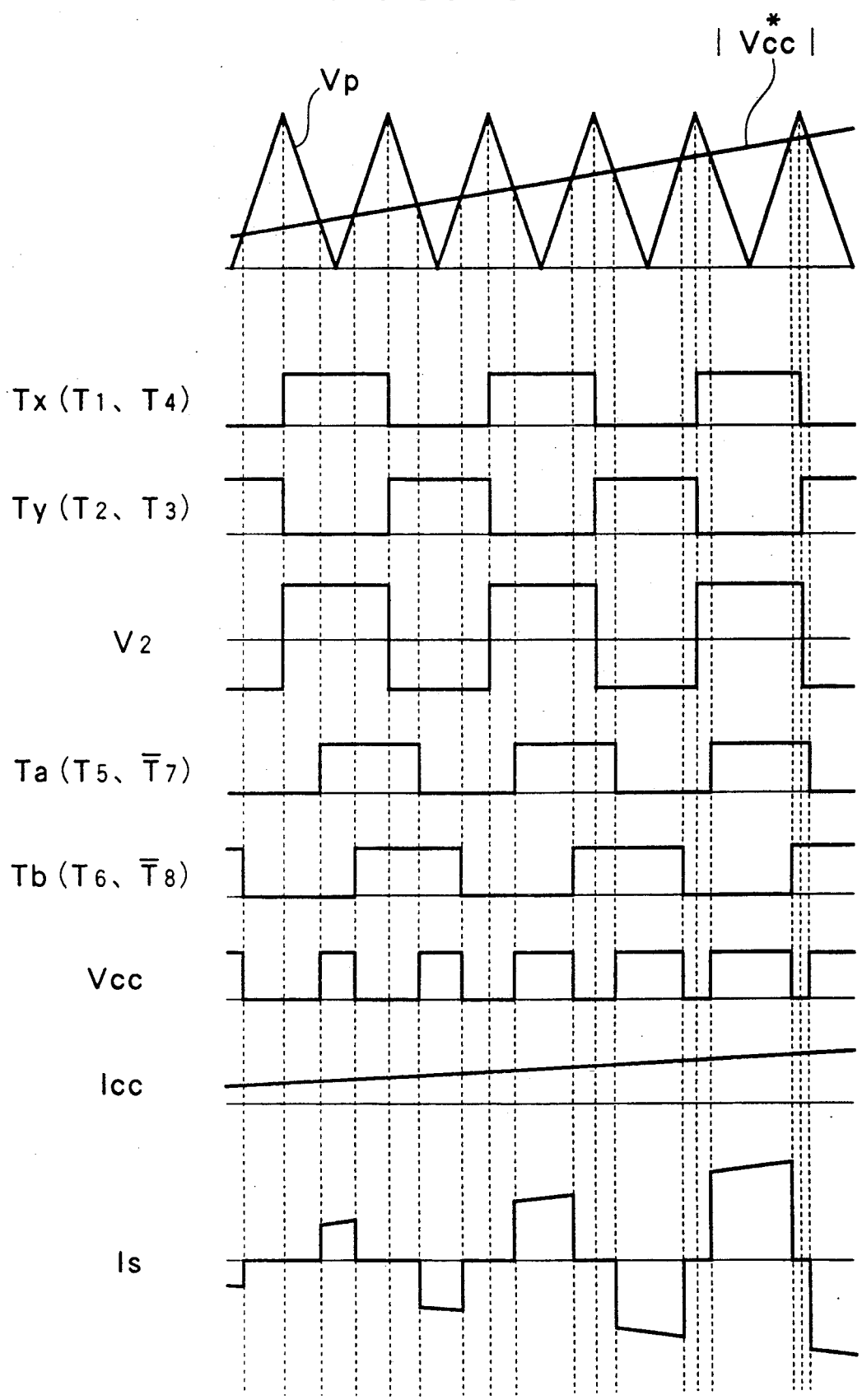
FIG. 5 is a timing chart which illustrates the operation of the first embodiment.

Then, the operation of the above-described structure will be described with reference to a timing chart shown in FIG. 5. First, carrier signal $V_p$ in the triangular form as shown in the uppermost portion of FIG. 5 is transmitted from the carrier signal generator 6A. Then, ON/OFF signals $T_1$ to $T_4$ the duty ratio of each of which is 50% are transmitted from the inverter switching circuit 17A due to the following operation: referring to FIG. 3, the carrier signal $V_p$ is supplied via the input terminal 170, signal synchronized with the peak of the carrier signal $V_p$, and input to the ½ divider 172 by the peak detecting circuit 171. Signal $T_x$ shown in FIG. 5 is transmitted from the ½ divider 172, while signal $T_y$ formed by inverting the sign of the signal $T_x$ is transmitted from the NOT circuit 173. As a result, the signal $T_x$ serving as the ON/OFF signals $T_1$ and $T_4$ are transmitted through the output terminals 174 and 175, while the signal $T_y$ serving as the ON/OFF signals $T_2$ and $T_3$ are transmitted through the output terminals 176 and 177. When the level of each of the ON/OFF signals $T_1$ to $T_4$ is high, the corresponding semiconductor switching devices $S_1$ to $S_4$ of the inverter circuit 14 shown in FIG. 2 are switched on, while the same are switched off when the above-described level is low. As a result of the structure shown in FIG. 2, the relationships among the semiconductor switching devices $S_1$ to $S_4$ and the secondary voltage $V_2$ of the transformer 2A are expressed as follows:

When the switches $S_1$ and $S_4$ are switched on:
$V_2 = V_{dc}$

When the switches $S_2$ and $S_3$ are switched on:
$V_2 = -V_{dc}$ (1)

where symbol $V_{dc}$ denotes the DC output voltage from the DC power source 12. Therefore, the secondary voltage $V_2$ becomes rectangular wave voltage the duty ratio of which is 50% as shown in FIG. 5.

On the other hand, reference voltage signal $V_{cc}^*$, which denotes the voltage to be transmitted from the cyclo-converter circuit 15, is transmitted from the reference voltage signal generating circuit 16 so as to be supplied to the switching signal generating circuit 18A together with the carrier signal $V_p$. When the switching signal generating circuit 18A receives the above-described signals $V_{cc}^*$ and $V_p$, it transmits the switching signals $T_5$ to $T_8$, the pulse width of each of which has been modulated, as follows: referring to FIG. 4, the reference voltage signal $V_{cc}^*$ supplied through the input terminal 201 is converted into absolute signal $|V_{cc}^*|$ by the absolute circuit 202. The above-described absolute signal $|V_{cc}^*|$ is divided into two portions either of which is supplied to the comparator 203 so as to be subjected to a comparison with the last transition of the carrier signal $V_p$ supplied via the input terminal 200 and the other of which is supplied to the comparator 205 so as to be subjected to a comparison with the first transition of $V_p$.

The output from the comparator 203 is transmitted to the ½ divider 204 which then transmits a signal $T_a$ shown in FIG. 5. The output from the comparator 205 is transmitted to the ½ divider 206 which then transmits signal $T_b$ shown in FIG. 5. When the signal $T_a$ is supplied to the NOT circuit 207, signal $T_c$ is transmitted. When the signal $T_b$ is supplied to the NOT circuit 208, signal $T_d$ is transmitted. Then, the relationships among the signals $T_a$ to $T_d$ and the output voltage $V_{cc}$ from the cyclo-converter circuit 15 will be described. When the polarity of the output voltage $V_{cc}$ is desired to be made positive, the switching signals $T_5$ to $T_8$ are determined in accordance with the following equations:

$$T_5=T_a, \ T_6=T_d, \ T_7=T_c, \ T_8=T_b \quad (4)$$

In response to the switching signals $T_5$ to $T_8$, the semiconductor switching devices $S_n$ and $S_{nA}$ ($n=5$ to 8) constituting the bi-directional switch are switched on/off. The relationships among the operation of the semiconductor switching devices $S_5$ to $S_8$ and $S_{5A}$ to $S_{8A}$ and the output voltage $V_{cc}$ from the cyclo-converter circuit 15 are expressed by the following equations:

When $S_5$ and $S_8$ (or $S_{5A}$ and $S_{8A}$) is switched on:
$V_{cc}=V_2$

When $S_6$ and $S_7$ (or $S_{6A}$ and $S_{7A}$) is switched on:
$V_{cc}=-V_2$

When $S_5$ and $S_6$ (or $S_{5A}$ and $S_{6A}$) is switched on:
$V_{cc}=0$

When $S_7$ and $S_8$ (or $S_{7A}$ and $S_{8A}$) is switched on:
$V_{cc}=0$ \quad (5)

Therefore, as can be shown from Equations (4) and (5), when the levels of the signals $T_a$ and $T_b$ are respectively high and low, $V_{cc}=V_2$. When the levels of the signals $T_a$ and $T_b$ are respectively low and high, $V_{cc}=-V_2$. When the levels of the signals $T_a$ and $T_b$ simultaneously high or low, $V_{cc}=0$. Therefore, the output voltage $V_{cc}$ from the cyclo-converter circuit 15 is, as shown in FIG. 5, subjected to the PWM operation so as to be made positive voltage. On the contrary, when the polarity of $V_{cc}$ is desired to be made negative, the switching signals $T_5$ to $T_8$ may be determined in accordance with the following equations:

$$T_5=T_c, \ T_6=T_b, \ T_7=T_a, \ T_8=T_d \quad (6)$$

The operation of the switching signal generating circuit 18A will now be described. The polarity discriminating circuit 209 transmits polarity signal $V_{sgn}$ of the reference voltage signal $V_{cc}^*$. Furthermore, the NOT circuit 210 transmits a signal obtained by inverting the sign of the polarity signal $V_{sgn}$. The above-described signals and signals $T_a$ to $T_d$ are supplied to the OR circuits 219 to 222 via the AND circuits 211 to 218. When the polarity of the reference voltage signal $V_{cc}^*$ is positive, the signals $T_a$, $T_c$, $T_d$ and $T_b$ are transmitted from the corresponding AND circuits 211, 214, 216 and 217. Therefore, the output terminals 223 to 226 transmit the switching signal $T_5$ to $T_8$ which correspond to Equation (4). Similarly, when the polarity of the reference voltage signal $V_{cc}^*$ is negative, the switching signals $T_5$ to $T_8$ corresponding to Equation (6) are transmitted.

As a result of the above-described operation, voltage $V_{cc}$ having the waveform formed by pulse-width-modulating the AC reference voltage signal $V_{cc}^*$ transmitted from the reference voltage signal generating circuit 16 is transmitted from the cyclo-converter circuit 15. Furthermore, the output voltage $V_{cc}$, from which its high frequency component has been removed by the filter circuit 4 connected to the output side of the cyclo-converter circuit 15, is supplied to the load circuit 13.

Then, the electric currents which respectively pass through the inverter 14 and the cyclo-converter 15 will now be described with reference to FIG. 5.

Output current $I_{cc}$ from the cyclo-converter 15 is, as shown in FIG. 5, a continuous electric current which is determined by the filter circuit 4 and the load circuit 13. The electric current which passes through the cyclo-converter 15 repeats the following two modes due to the PWM operation performed by the switching element, that is, a mode in which it passes through the cyclo-converter 15 and another mode in which it circulates in the cyclo-converter 15:

(i) Passing Mode

A mode in which two arms $S_5$ and $S_8$ of the cyclo-converter arms or two arms $S_6$ and $S_7$ of the same are simultaneously turned on so that the voltage $V_{cc}$ is transmitted. The output current $I_{cc}$ is transmitted from the inverter 14 via the cyclo-converter 15.

(ii) Circulation Mode

A mode in which two arms $S_5$ and $S_6$ of the cyclo-converter arms or two arms $S_7$ and $S_8$ of the same are simultaneously turned on so that the voltage $V_{cc}$ becomes zero. The output current $I_{cc}$ circulates in the cyclo-converter 15 before it is transmitted. Therefore, no electric current passes through the inverter 14.

Therefore, as shown in FIG. 5, the input electric current $I_s$ received by the cyclo-converter 15 passes in only a period in which the voltage $V_{cc}$ is transmitted. The pulse width of $V_{cc}$ is controlled in such a manner that its center is made to be the zero point of the carrier signal $V_p$. Thus, its width becomes the width between two peaks of $V_p$ when the pulse width becomes largest. Therefore, by setting the gain of the reference voltage generating circuit 16 in such a manner that the maximum absolute value $|V_{cc}^*|$ of the reference voltage signal shown in FIG. 5 is smaller than the peak value of the carrier signal $V_p$, $V_{cc}$ necessarily becomes zero in the vicinity of the peak value of the carrier signal $V_p$ and also $I_s$ necessarily becomes zero. On the other hand, the ON/OFF signals $T_x$ and $T_y$ synchronize with the peak of the carrier signal $V_p$ as shown in FIG. 5, switching of the inverter 14 is necessarily performed in a period $I_s=0$, that is, in a period in which the electric current is not substantially passed through each arm of the inverter 14. The switching loss of the switching element of the inverter 14 relates to the electric current, which passes through the switching element, and the applied voltage. Therefore, when the level of the electric current is zero, no switching loss is generated. That is, the inverter 14 is able to be operated while preventing the switching loss.

Since the surge voltage which is generated due to switching of the inverter 14 and which affects the voltage resistance of the circuit element is generated when the electric current which passes through by a quantity corresponding to the inductance of the inverter circuit 14 is interrupted, an undesirable surge voltage cannot be generated by performing the switching operation when the electric current, which passes through the switching element, is zero.

Figure 6:
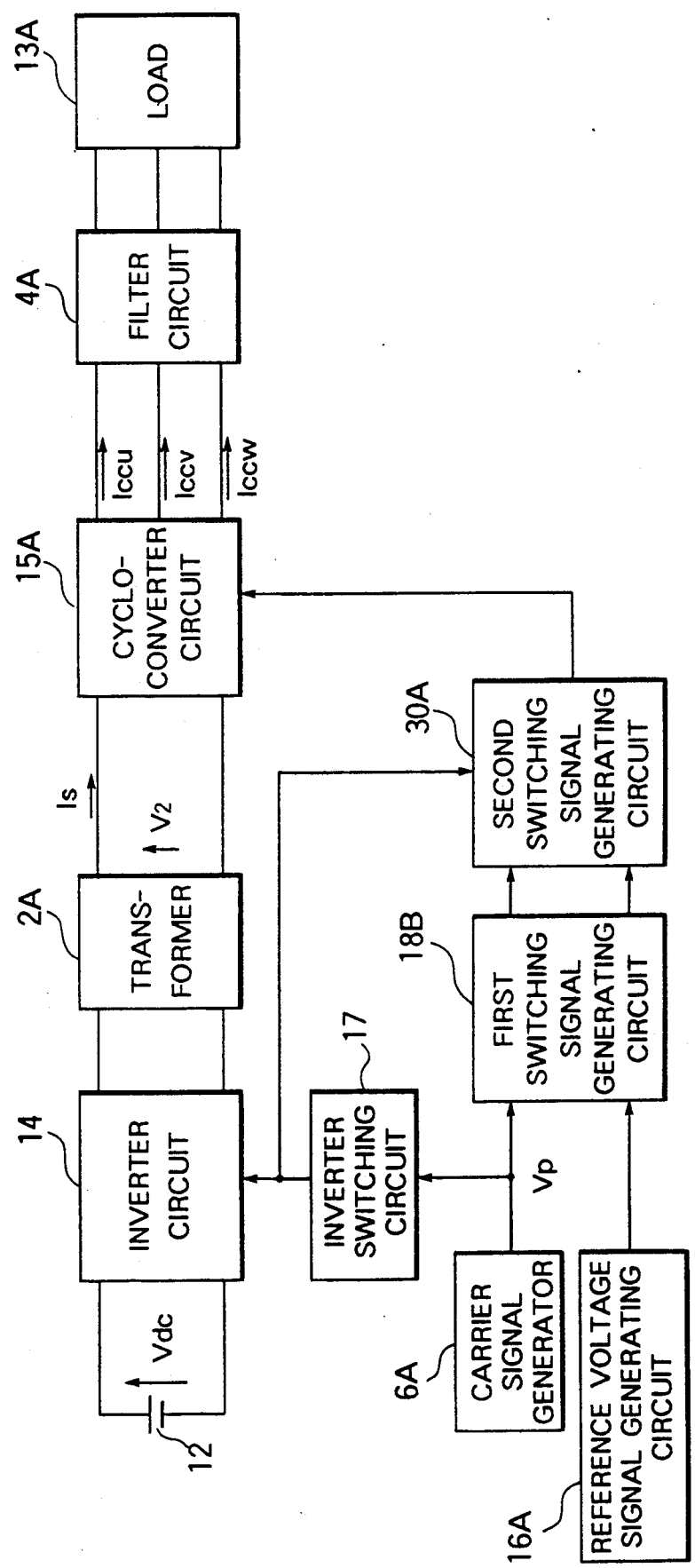
FIG. 6 is a block diagram which illustrates a second embodiment of the present invention.

Then, a second embodiment of the present invention will be described with reference to FIGS. 6 to 10. According to this embodiment, a three-phase AC voltage is transmitted as an example of the cases in which a multi-phase AC output is obtained. FIG. 6 is a block diagram which illustrates the second embodiment. Referring to the drawing, reference numeral 4A represents a filter circuit, 15A represents a cyclo-converter circuit and 16A represents a reference voltage signal generating circuit. Reference numeral 18B represents a first switching signal generating circuit, 30A represents a second switching signal generating circuit and 13A represents a three-phase load circuit connected to the above-described DC-to-AC electric power converting apparatus. The other elements are the same as the elements according to the first embodiment.

Figure 7:
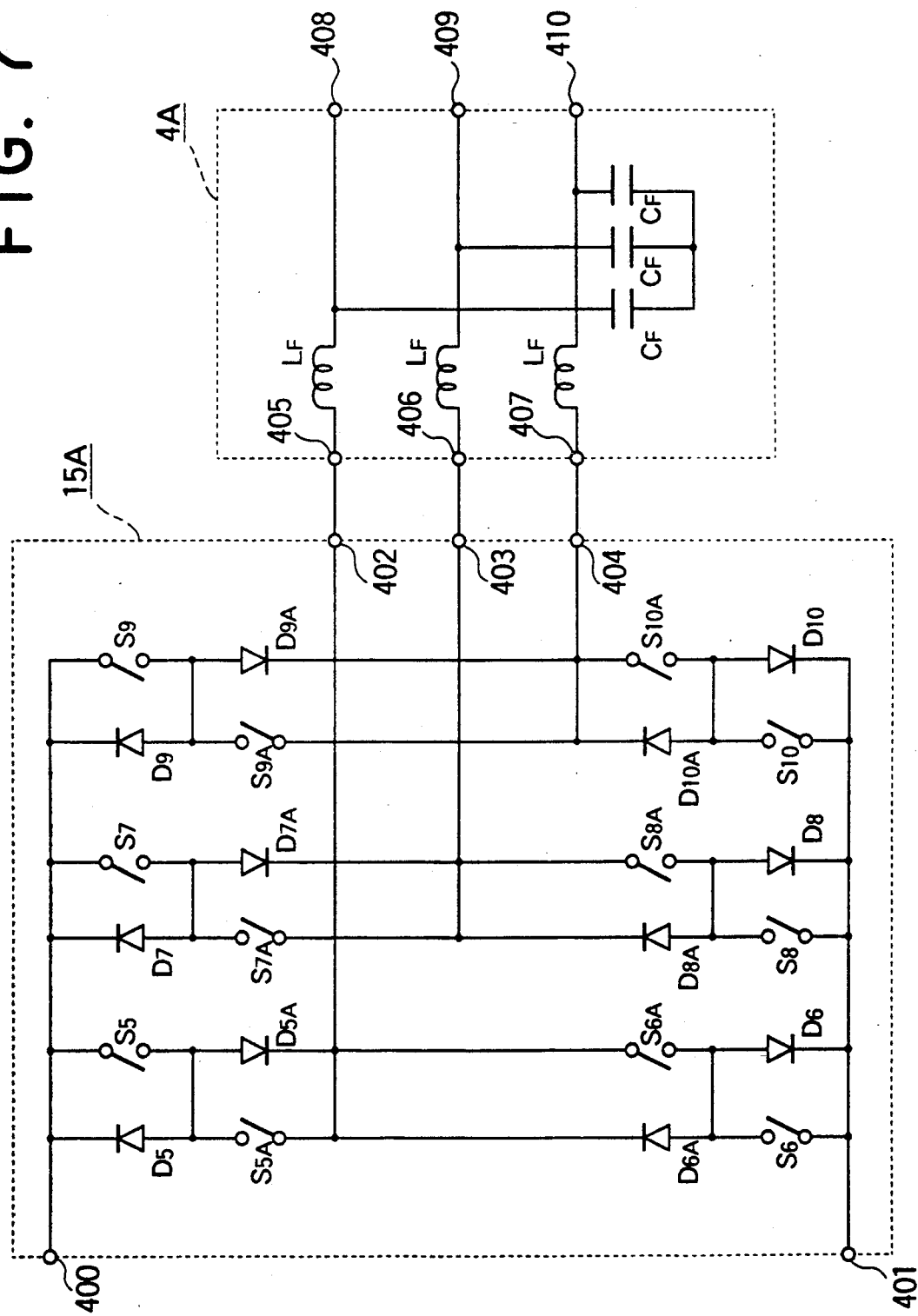
FIG. 7 is a block diagram which illustrates a cyclo-converter circuit and a filter circuit according to the second embodiment.

FIG. 7 illustrates the detailed structure of the cyclo-converter circuit 15A and that of the filter circuit 4A. The cyclo-converter circuit 15A comprises input terminals 400 and 401 connected to the secondary coil terminals 23 and 24 of the transformer 2A, semiconductor switching devices $S_5$ to $S_{10}$ and $S_{5A}$ to $S_{10A}$ such as transistors and MOSFETs, diodes $D_5$ to $D_{10}$ and $D_{5A}$ to $D_{10A}$ connected to the above-described switching devices $S_5$ to $S_{10}$ and $S_{5A}$ to $S_{10A}$ in an inverted parallel manner and output terminals 402 and 404 connected to the filter circuit 4A. The above-described two semiconductor switching devices $S_n$ and $S_{nA}$ (n=5 to 10) and diodes $D_n$ and $D_{nA}$ (n=5 to 10) connected to the two semiconductor switching devices $S_n$ and $S_{nA}$ (n=5 to 10) constitute bidirectional switches each of which is arranged in such a manner that the direction, through which electric power is supplied, can be controlled.

The filter circuit 4A comprises input terminals 405 to 407 respectively connected to the output terminals 402 to 404 of the cyclo-converter circuit 15A, reactors $L_F$ and condensers $C_F$ and output terminals 408 to 410.

Figure 8:
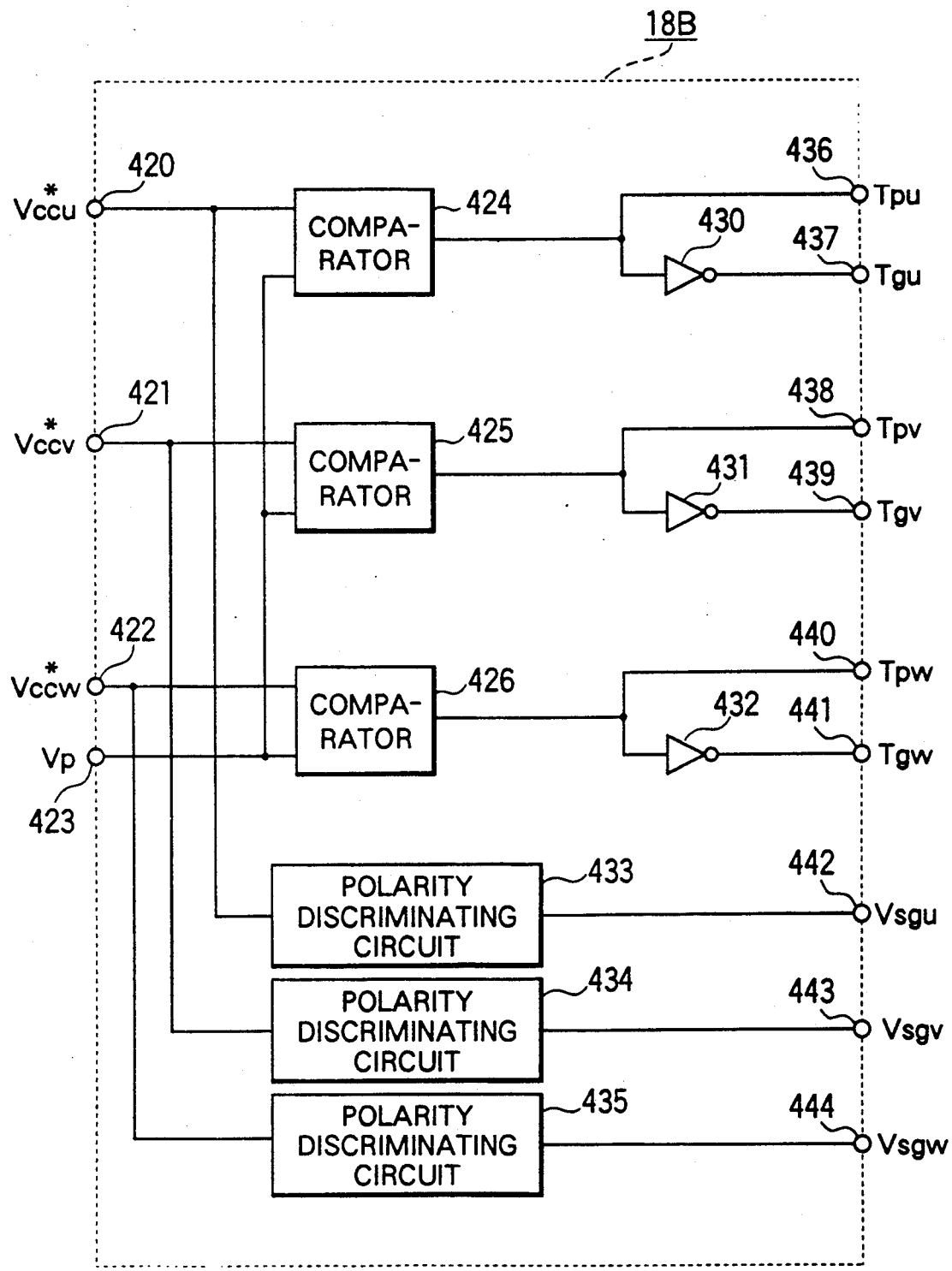
FIG. 8 is a block diagram which illustrates a first switching signal generating circuit according to the second embodiment.

FIG. 8 illustrates the detailed structure of the first switching signal generating circuit 18B which comprises input terminals 420 to 422 connected to the reference voltage signal generating circuit 16A, an input terminal 423 connected to the carrier signal generator 6A, comparators 424 to 426, NOT circuits 430 to 432, polarity discriminating circuits 433 to 435 and output terminals 436 to 444.

Figure 9:
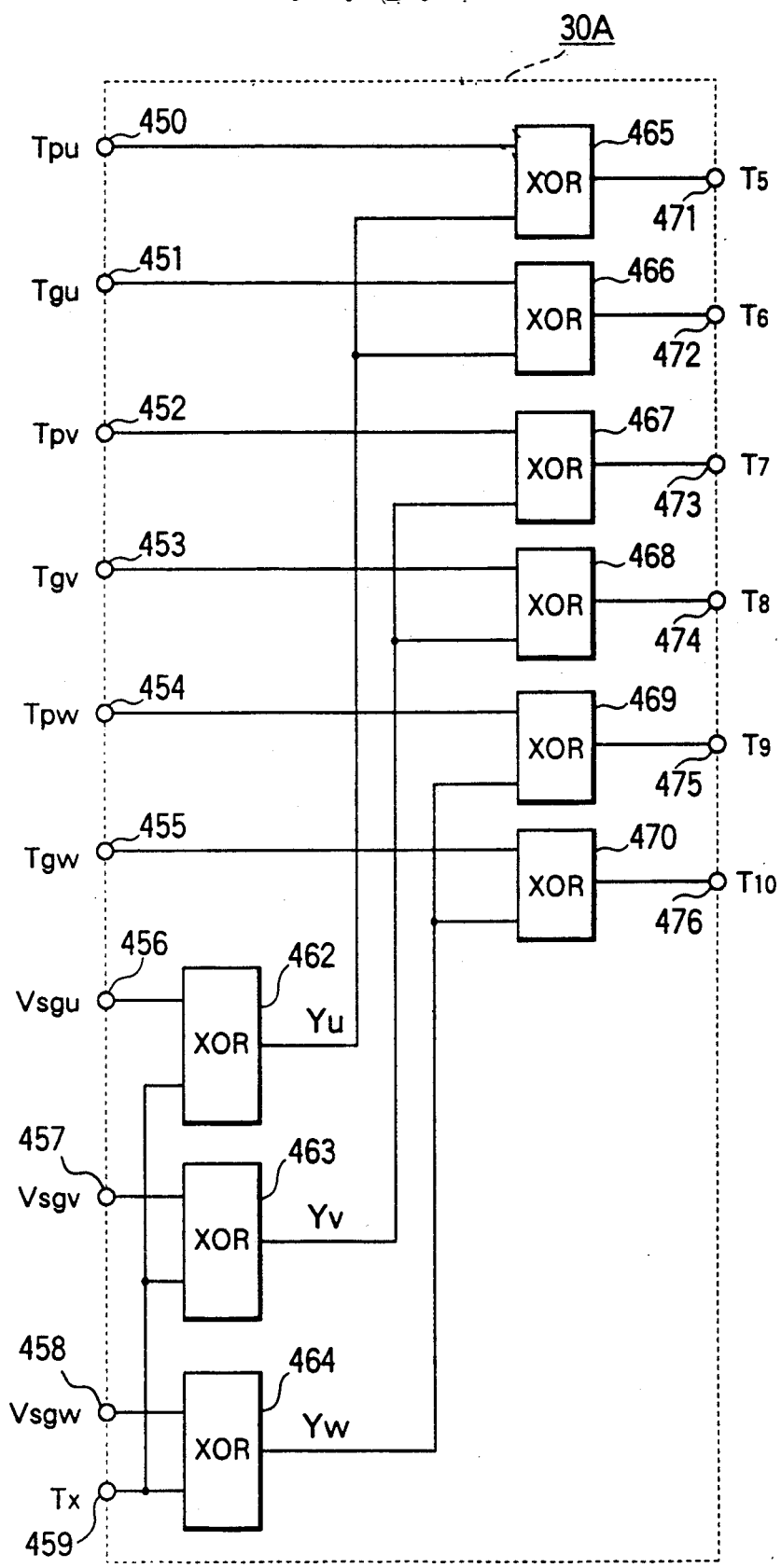
FIG. 9 is a block diagram which illustrates a second switching signal generating circuit according to the second embodiment.

FIG. 9 illustrates the detailed structure of the second switching signal generating circuit 30A which comprises input terminals 450 to 455 connected to the output terminals 436 to 441 of the first switching signal generating circuit 18B, input terminals 456 to 458 connected to the output terminals 442 to 444, an input terminal 459 connected to the inverter switching circuit 17, XOR (exclusive OR) circuits 462 to 470 and output terminals 471 to 476.

Figure 10:
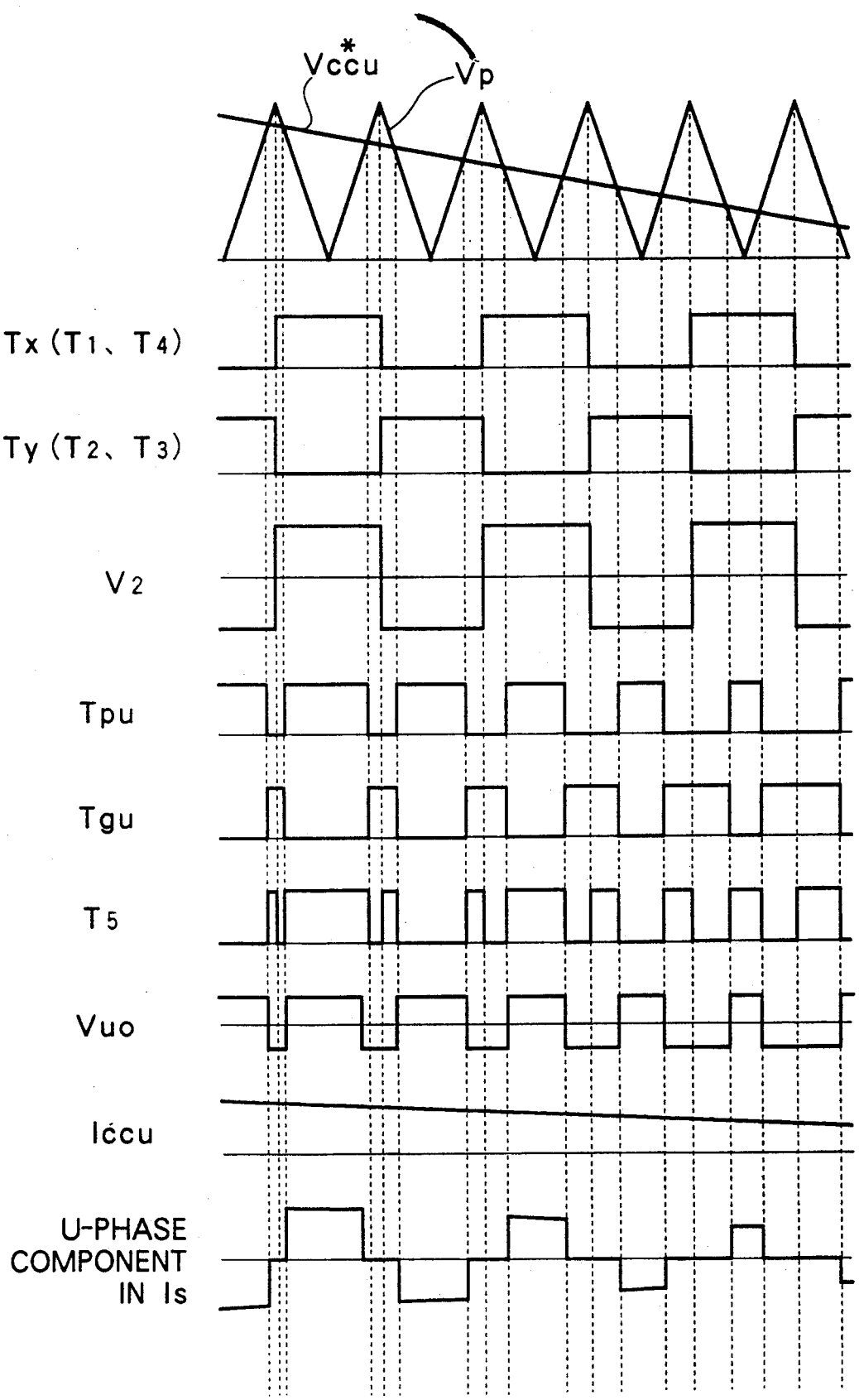
FIG. 10 is a timing chart which illustrates the operation of the second embodiment.

Then, the operation of the second embodiment will be described with reference to FIG. 10. First, the triangle shape carrier signal $V_p$ shown in the uppermost portion of FIG. 10 is transmitted from the carrier signal generator 6A. The carrier signal $V_p$ is then supplied to the inverter switching circuit 17 so that the inverter switching circuit 17 transmits the ON/OFF signals $T_1$ to $T_4$. The four semiconductor switching devices $S_1$ to $S_4$ of the inverter circuit 14 are switched on/off in response to the ON/OFF signals $T_1$ to $T_4$. As a result, the secondary voltage $V_2$ of the transformer 2A becomes rectangular waveform voltage the duty ratio of which is 50% as shown in FIG. 10. Since the above-described operation is the same as that according to the first embodiment, the detailed description is omitted here. Then, three-phase (phases, u, v and w) AC reference voltage signals $V_{ccu}*$, $V_{ccv}*$ and $V_{ccw}*$ are transmitted from the reference voltage signal generating circuit 16A so as to be supplied, together with the carrier signal $V_p$, to the first switching signal generating circuit 18B.

Then, the operation of the four switching devices $S_5$, $S_6$, $S_{5A}$ and $S_{6A}$ included in the cyclo-converter circuit 15A for controlling the voltage of the phase u will be described with reference to FIG. 10. Referring to FIG. 8, the u-phase reference voltage signal $V_{ccu}*$ supplied to the input terminal 420 of the first switching signal generating circuit 18B is, together with the carrier signal $V_p$ supplied to the input terminal 423, supplied to the comparator 424. As a result, the first switching signal $T_{pu}$ as shown in FIG. 10 is transmitted from the comparator 424. The signal $T_{pu}$ is supplied to the NOT circuit 430 so that the first switching signal $T_{qu}$ shown in FIG. 10 is transmitted. These first switching signals $T_{pu}$ and $T_{qu}$ are transmitted through the output terminals 436 and 437, respectively. The polarity of $V_{ccu}*$ is discriminated by the polarity discriminating circuit 433 so as to be transmitted through the output terminal 442 as u-phase voltage polarity signal $V_{sgn}$.

Then, the operation of the second switching signal generating circuit 30A will be described. Referring to FIG. 9, the u-phase voltage polarity signal $V_{sgu}$ transmitted from the first switching signal generating circuit 18B and the signal Tx, which is shown in FIG. 10, transmitted from the inverter switching circuit 17A are supplied to the XOR circuit 462 via the input terminals 456 and 459. The XOR circuit 462 transmits the signal $Y_u$ of a high level when the level of the polarity signal $V_{sgu}$ and that of the signal Tx are the same (that is, the polarity of the u-phase output voltage $V_{ccu}$ of the cyclo-converter 15A and that of the secondary voltage $V_2$ of the transformer 2A are the same). On the other hand, the XOR circuit 462 transmits the $Y_u$ signal of a low level when the level of the polarity signal $V_{sgn}$ and that of the signal Tx are different from each other. Then, the switching signals $T_{pu}$ and $T_{qu}$ transmitted from the first switching signal generating circuit 18B are supplied via the input terminals 450 and 451 so as to be supplied, together with the signal $Y_u$, to the XOR circuits 465 and 466. In response to this, the second switching signals $T_5$ and $T_6$ which correspond to the polarity of the secondary voltage $V_2$ are transmitted from the XOR circuits 465 and 466 through the output terminals 471 and 472. As a result, the switching devices $S_5$, $S_6$, $S_{5A}$ and $S_{6A}$ are switched on/off.

The output voltage from the cyclo-converter circuit 15A will now be described with reference to phase u. While arranging the electric potential at the neutral point of the voltage supplied to the cyclo-converter circuit 15A, that is, the electric potential at the midpoint of the secondary coil of the transformer 2A to be the reference, voltage $V_{uo}$ of the u-phase output terminal 402 is expressed by the following equation:

When $S_5$ or $S_{5A}$ is switched on: $V_{uo} = \dfrac{V_2}{2}$ (7)

When $S_6$ or $S_{6A}$ is switched on: $V_{uo} = -\dfrac{V_2}{2}$

Since the signal $T_5$ for switching the switching elements $S_5$ and $S_{5A}$ is generated from the PWM signal $T_{pu}$ and the signal $T_x$ denoting the polarity of $V_2$ in the above-described manner, the waveform of the voltage $V_{uo}$ becomes as shown in FIG. 10, the waveform being formed by pulse-width modulating in such a manner that its basic wave component becomes $V_{ccu}^*$ corresponding to the PWM signal $T_{pu}$.

Also the waveforms of the v-phase output voltage $V_{vo}$ and the w-phase output voltage $V_{wo}$ become those corresponding to the reference signals $V_{ccv}^*$ and $V_{ccw}^*$, respectively before they are transmitted to the v-phase output terminal 403 and the w-phase output terminal 404, respectively. The high frequency components of the output voltages $V_{uo}$, $V_{vo}$ and $V_{wo}$ are removed by the filter circuit 4A before they are transmitted to the output terminals 408 to 410 so as to be supplied to the load circuit 13A.

Taking note of the electric current which passes through the cyclo-converter 15A, there exists a passing mode and a circulation mode similar to the above-described first embodiment. However, since the three-phase circuit has a plurality of arms through which the electric current circulates, it circulates through the v-phase arms ($S_7$ and $S_{7A}$ or $S_8$ and $S_{8A}$), the w-phase arms ($S_9$ and $S_{9A}$ or $S_{10}$ and $S_{10A}$) or both the above-described arms in a case of, for example, the circulation of the u-phase electric current $I_{ccu}$ circulates. However, since the sum of the three-phase electric currents is always zero ($I_{ccu}+I_{ccv}+I_{ccw}=0$), there is a mode in which only a portion of the u-phase electric current circulates. All of the three-phase electric currents circulate when the three arms $S_5$ (or $S_{5A}$), $S_7$ (or $S_{7A}$) and $S_9$ (or $S_{9A}$) are simultaneously turned on or when the three arms $S_6$ (or $S_{6A}$), $S_8$ (or $S_{8A}$), $S_{10}$ (or $S_{10A}$) are simultaneously turned on.

As can be seen from FIG. 10, the switching pattern in which all of the three-phase electric currents circulate is necessarily generated in the vicinity of the peak value of the carrier signal $V_p$ similarly to the above-described first embodiment. Therefore, also according to the second embodiment, switching of the inverter is necessarily performed in the period $I_s=0$, that is, in the period, in which the electric current is not substantially passed through each arm of the inverter. As a result, a three-phase output voltage can be obtained while preventing the generation of the switching loss in the inverter and as preventing the surge voltage.

Then, a third embodiment of the present invention will now be described with reference to FIGS. 11 to 14. According to this embodiment, a three-phase AC voltage is transmitted.

Figure 11:
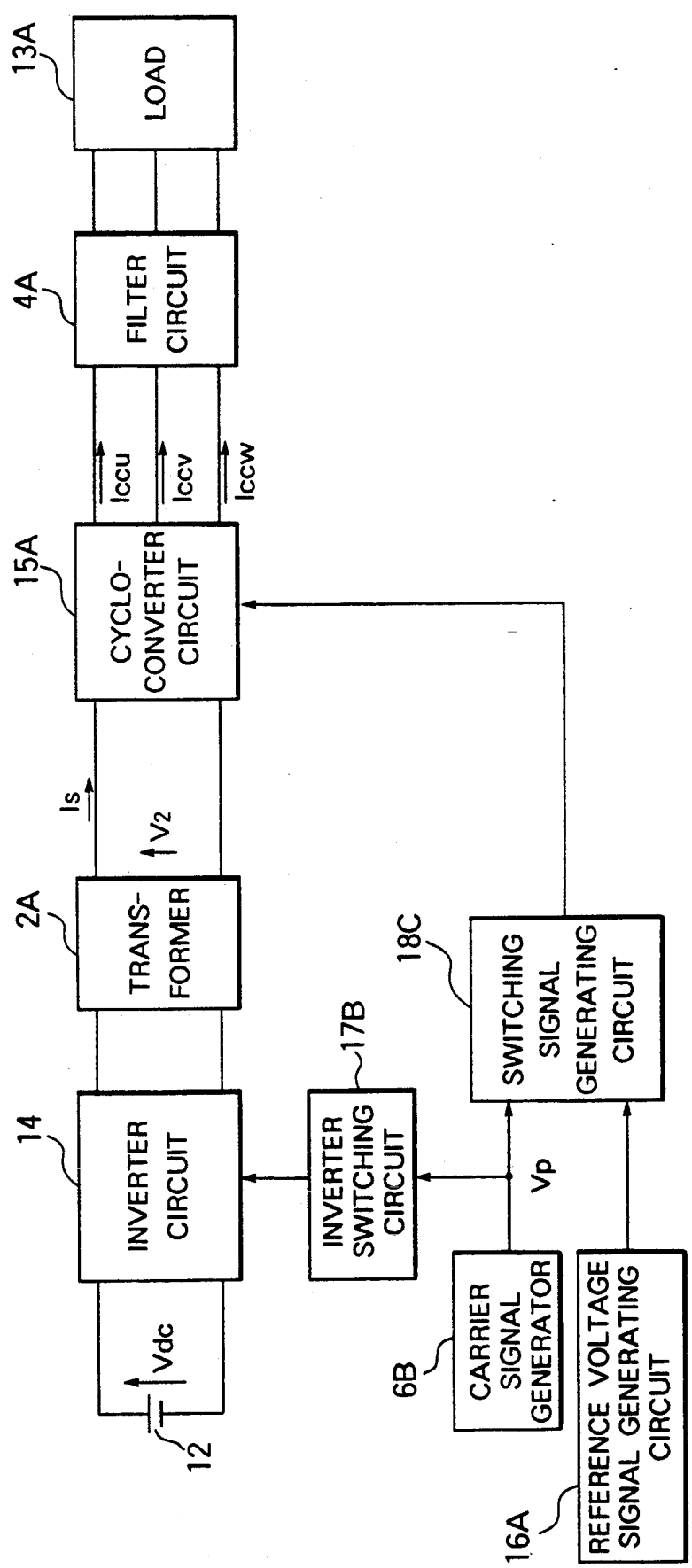
FIG. 11 is a block diagram which illustrates a third embodiment of the present invention.

FIG. 11 is a block diagram which illustrates the structure of the third embodiment, where reference numeral 6B represents a carrier signal generator for generating a sawtooth-shaped carrier signal, 17B represents an inverter switching circuit and 18C represents a switching signal generating circuit. The other structures are the same as those according to the second embodiment shown in FIG. 6.

Figure 12:
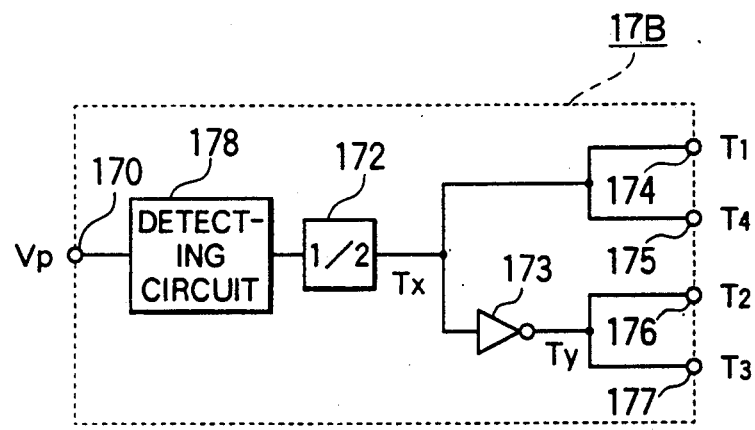
FIG. 12 is a block diagram which illustrates an inverter switching circuit according to a third embodiment.

FIG. 12 illustrates the detailed structure of the inverter switching circuit 17B which is structured in the same manner as the inverter switching circuit 17A according to the first and second embodiments except for the arrangement in which a detection circuit 178 is employed in place of the peak detection circuit 171, the detection circuit 178 according to this embodiment acting to generate a signal at the first transition edge of the input signal supplied to the input terminal 170.

Figure 13:
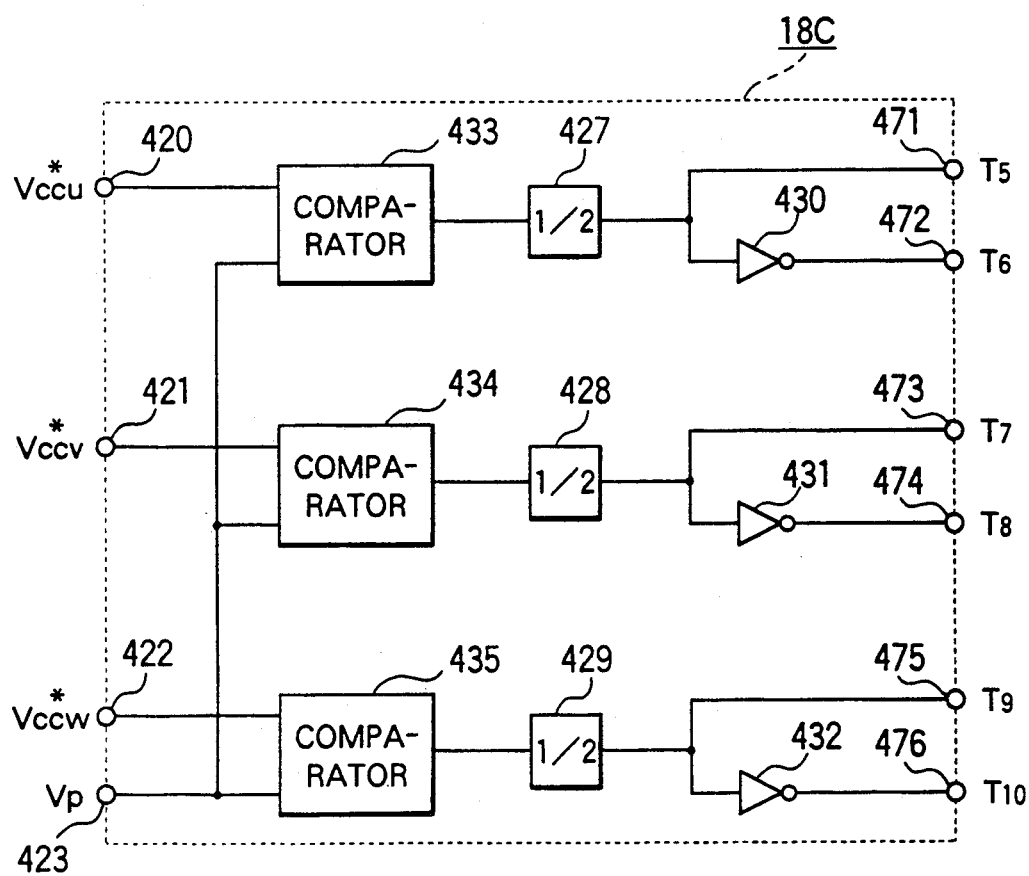
FIG. 13 is a block diagram which illustrates a switching signal generating circuit according to the third embodiment.

FIG. 13 illustrates the detailed structure of the switching signal generating circuit 18C which comprises the input terminals 420 to 422 connected to the reference signal generating circuit 16A, the input terminal 423 connected to the carrier signal generator 6B, comparators 433 to 435 arranged to transmit output signals, each of which has a narrow width at the intersections between the last transition slope of the carrier signal $V_p$ and the reference voltage signals $V_{ccu}^*$, $V_{ccv}^*$ and $V_{ccw}^*$, ½ dividers 427 to 429, NOT circuits 430 to 432 and the output terminals 471 to 476.

Then, the operation of the third embodiment thus-constituted will now be described with reference to FIG. 14.

Figure 14:
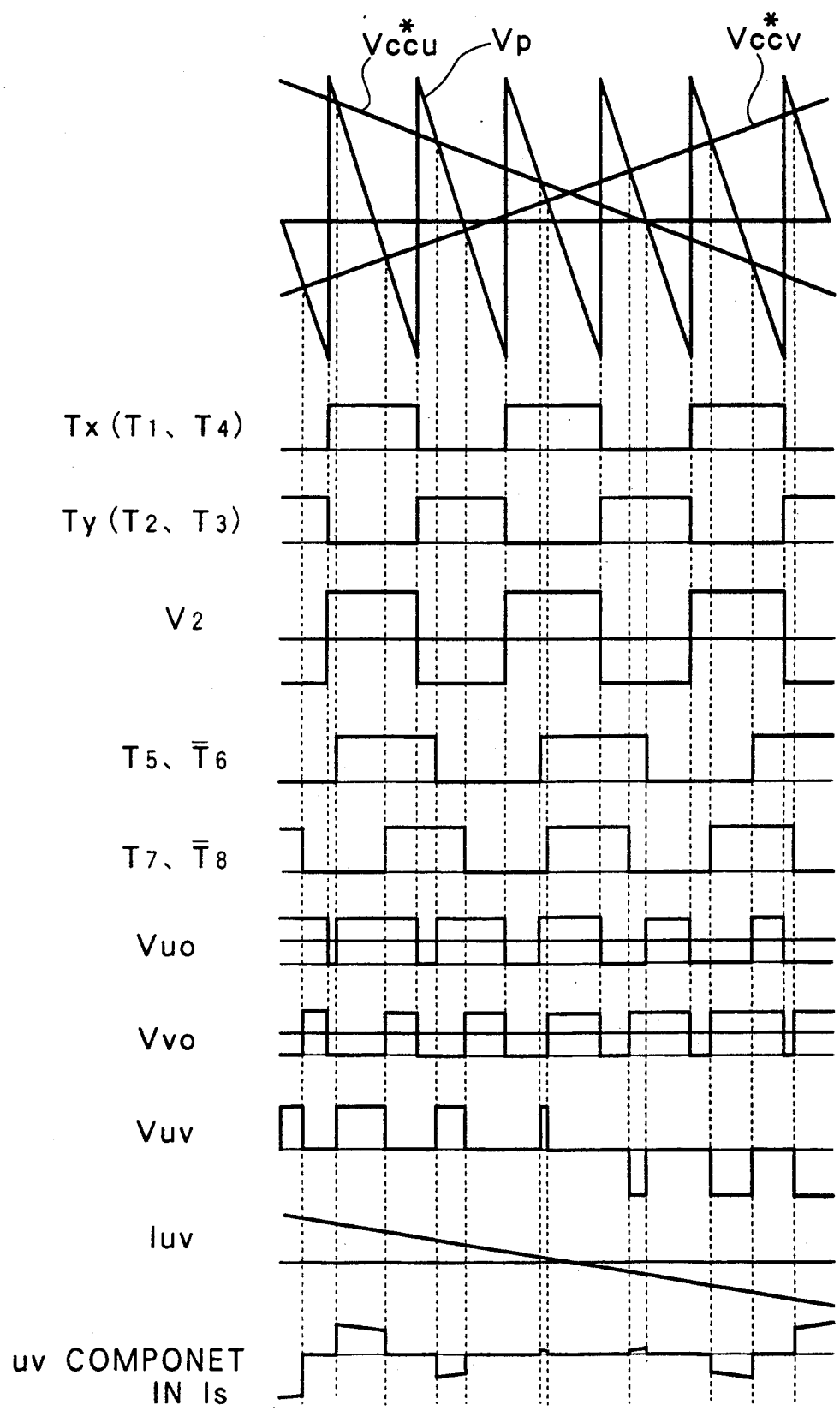
FIG. 14 is a timing chart which illustrates the operation of the third embodiment.
Figure 15:
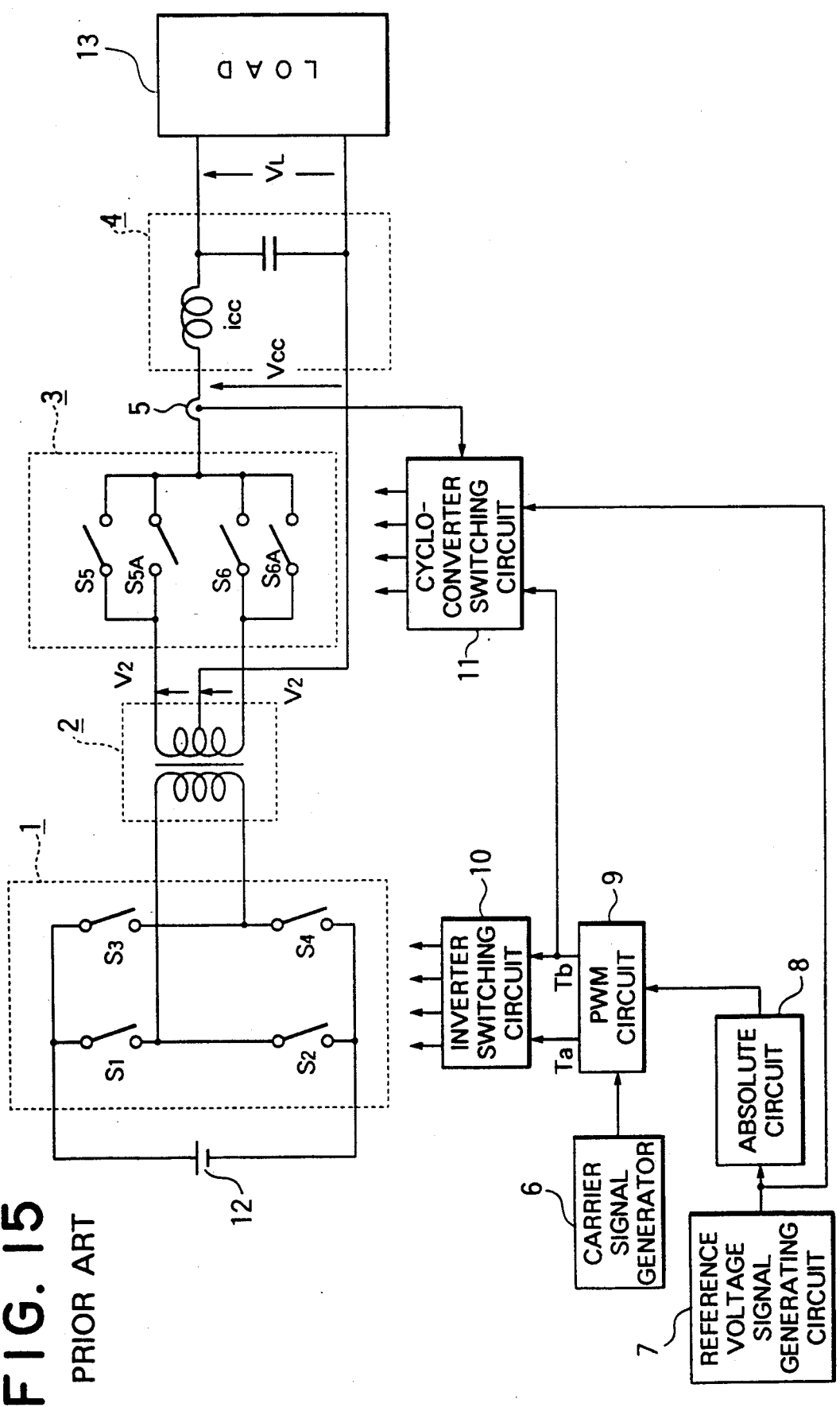
FIG. 15 is a block diagram which illustrates a conventional DC-to-AC electric power converting apparatus.
Figure 16:
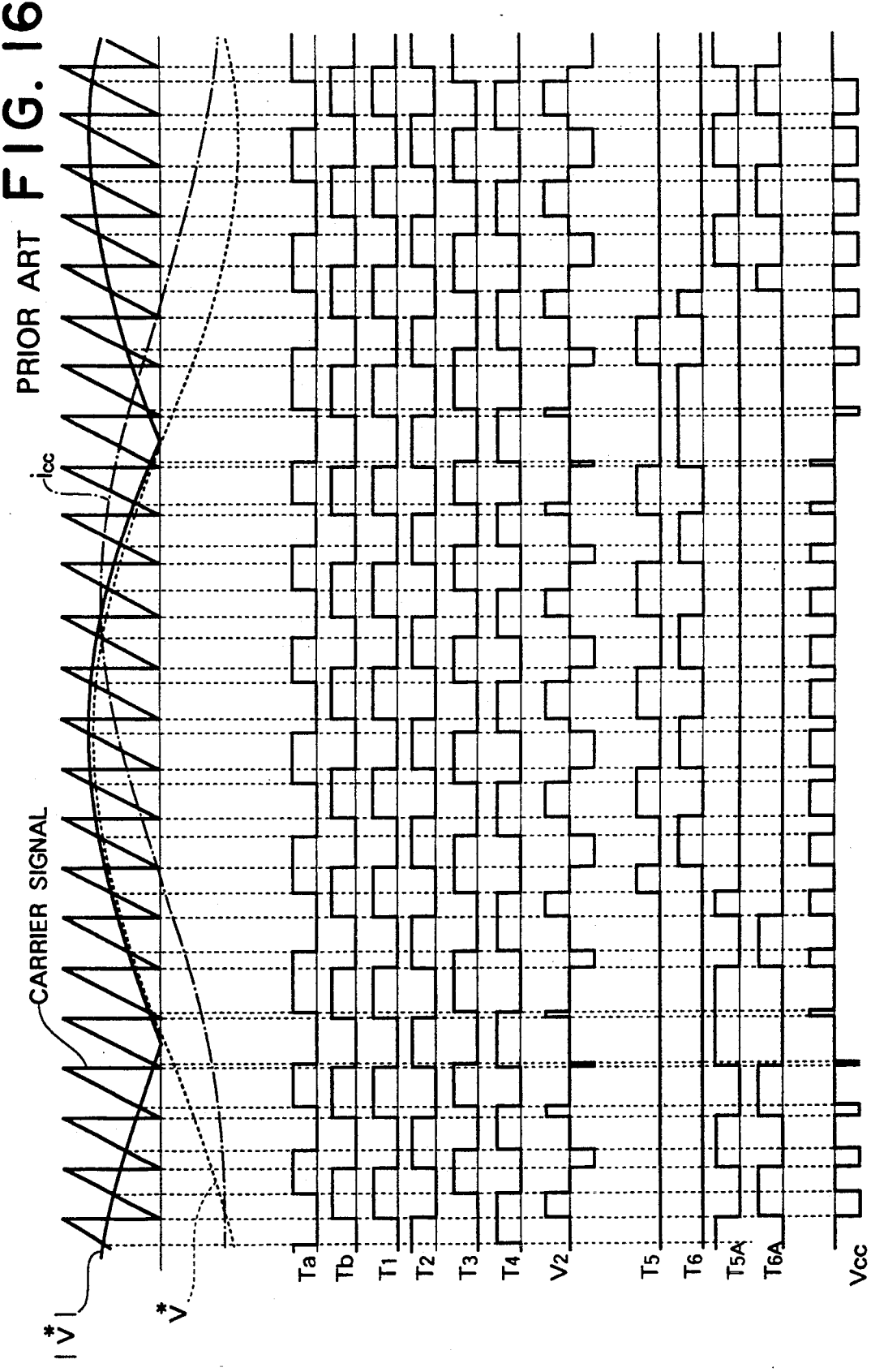
FIG. 16 is a timing chart which illustrates the operation of the DC-to-Ac electric power converting apparatus shown in FIG. 15.

First, the carrier signal $V_p$ formed into a sawtooth shape which is lowered to the right as shown in FIG. 14 is transmitted from the carrier signal generator 6B. Then, by supplying the carrier signal $V_p$ thus-transmitted to the inverter switching circuit 17B, an inverter ON/OFF signal $T_x$ ($T_1$, $T_4$) and $T_y$ ($T_2$, $T_3$) which synchronize with the first transition edge of $V_p$ is transmitted to the inverter circuit 14, causing the four switching elements $S_1$ to $S_4$ of the inverter circuit 14 to be switched on or off by corresponding signals. As a result, the secondary voltage $V_2$ of the transformer 2A becomes, as shown in FIG. 14, a rectangular waveform voltage which synchronizes with the first transition edge of the carrier signal $V_p$ and the duty ratio of which is 50%. Then, the reference voltage signal generating circuit 16A transmits the three-phase AC reference voltage signals $V_{ccu}^*$, $V_{ccv}^*$ and $V_{ccw}^*$ before they are, together with the above-described carrier signal $V_p$, supplied to the switching signal generating circuit 18C.

Taking note of phase u, a narrow-width pulse is transmitted from the comparator 433 at the intersection between the first transition slope of the carrier signal $V_p$ and the reference voltage signal $V_{ccu}^*$ before it is divided by the ½ divider 427. As a result, the switching signal $T_5$ formed as shown in FIG. 14 is transmitted to the output terminal 471. Furthermore, the signal $T_6$ obtained by inverting the signal $T_5$ in the NOT circuit 430 is transmitted to the output terminal 472. Similarly, the signals $T_7$ and $T_8$ which correspond to the phase v are transmitted to the output terminals 473 and 474 and the signals $T_9$ and $T_{10}$ corresponding to the phase w are transmitted to the output terminals 475 and 476. In this state, since the three ½ dividers 427 to 429 are synchronized with each other, the signals $T_5$, $T_7$ and $T_9$ respectively first-rise or trail in the same period of the carrier signal $V_p$.

The switching signals $T_5$ to $T_{10}$ respectively switch on/off the switching element pairs composed of the switching elements $S_5$–$S_{5A}$ to $S_{10}$–$S_{10A}$ of the cyclo-converter circuit 15A.

As a result, the output voltage $V_{uo}$ formed by pulse-width-modulating $V_{ccu}^*$ can be obtained at the u-phase output terminal 402 of the cyclo-converter circuit 15A, while the output voltage $V_{vo}$ formed by pulse-width modulating $V_{ccu}^*$ can be obtained at the v-phase output terminal 403 of the same. In this state, the voltage $V_{uv}$ between the phases u and v becomes the difference between $V_{uo}$ and $V_{vo}$.

Similarly to the first and second embodiments, the third embodiment is enabled to have the cyclo-converter electric current passing mode and the circulating mode. Taking note of the electric current $I_{uv}$ which passes between the phase u and the phase v, the period in which the voltage is transmitted to $V_{uv}$ becomes the passing mode similarly to the first embodiment. Therefore, the waveform of the uv component in $I_s$ becomes as shown in FIG. 14.

As a result of a comparison made between the uv component in $I_s$ and $T_x$ and $T_y$ shown in FIG. 14, it can be understood that the switching of the inverter circuit is necessarily performed in the period of the circulating mode. Since the same result can be obtained also considering the electric current passing through the phase w, all of the three electric currents are brought into the circulating mode in the vicinity of the first transition edge of the carrier signal $V_p$. Therefore, also according to the third embodiment, the switching of the inverter circuit is performed in the period $I_{s=0}$, that is, in a period in which the electric current is not substantially passed through each arm of the inverter circuit. As a result, the same effect as that obtainable according to the first and second embodiments can be obtained.

Furthermore, according to the third embodiment, an effect can be obtained in that the structure can be simplified in comparison to the second embodiment. Although the description has been made about the three-phase structure, the cyclo-converter can be constituted as the mono-phase output similarly to the first embodiment.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A DC-to-AC electric power converting apparatus comprising:
    an invertor circuit having a plurality of switching elements and converting DC electric power into AC electric power;
    a transformer connected to said invertor circuit;
    a cyclo-converter circuit connected to said transformer;
    a carrier signal generator for generating a carrier signal of a predetermined frequency;
    an invertor switching circuit having a peak detection circuit connected to an input which detects a peak of a signal supplied to the input so that the switching operation of a plurality of the switching elements of said invertor circuit is synchronized with the carrier signal, the switching operation occurring in a period in which no electric current is passed through said invertor circuit;
    a reference voltage signal generating circuit for generating a reference voltage signal for AC voltage to be transmitted from said cyclo-converter circuit; and
    a switching signal generating circuit for generating a control signal for controlling said cyclo-converter circuit in response to said reference voltage signal generated by said reference voltage signal generating circuit and said carrier signal generated by said carrier signal generator.

2. An apparatus according to claim 1 wherein said inverter switching circuit switches on/off a plurality of said switching elements of said inverter circuit in a period in which an output electric current from said cyclo-converter circuit circulates in said cyclo-converter circuit.

3. An apparatus according to claim 1 wherein said inverter switching circuit transmits a control signal having a duty ratio of about 50% to said inverter circuit.

4. An apparatus according to claim 1 wherein said cyclo-converter circuit includes a plurality of switching elements which transmit AC power which has been subjected to pulse width modulation.

5. An apparatus according to claim 1 wherein said cyclo-converter circuit transmits multi-phase AC power.

6. An apparatus according to claim 1 further comprising a filter circuit for removing the high frequency component of the output from said cyclo-converter circuit.

7. An apparatus according to claim 1 wherein said switching signal generating circuit includes a polarity discriminating circuit connected to a reference voltage signal input which determines the sign of the reference voltage.

8. A DC-to-AC electric power converting apparatus comprising:
    an invertor circuit having a plurality of switching elements and converting DC electric power into AC electric power;
    a transformer connected to said invertor circuit;
    a cyclo-converter circuit connected to said transformer;
    a carrier signal generator for generating a carrier signal of a predetermined frequency;
    an invertor switching circuit which generates a number of output signals for controlling the switching operation of a plurality of said switching elements of said invertor circuit in synchronization with the carrier signal, and switching a plurality of the switching elements of said invertor circuit in a period in which no electric current is passed through said invertor circuit;
    a reference voltage signal generating circuit for generating a reference voltage signal for AC voltage to be transmitted from said cyclo-converter circuit;
    a first switching signal generating circuit for generating a first set of switching signals in response to a reference voltage signal and a carrier signal; and
    a second switching signal generating circuit connected to said first switching signal generating circuit which generates a second set of switching signals responsive to the first set of switching signals, a three-phase voltage polarity signal and an output signal from said invertor switching circuit.

9. A DC-to-AC electric power converting apparatus comprising:
    an invertor circuit having a plurality of switching elements and converting DC electric power into AC electric power;
    a transformer connected to said invertor circuit;
    a cyclo-converter circuit connected to said transformer;
    a carrier signal generator for generating a carrier signal of a predetermined frequency;

an invertor switching circuit having a detection circuit connected to an input of said inverter switching circuit which generates a signal at a first transition edge of a signal supplied to the input of the inverter switching circuit so that the switching operation of a plurality of the switching elements of said invertor circuit is synchronized with a first transition edge of the carrier signal, the switching operation occurring in a period in which no electric current is passed through said invertor circuit;

a reference voltage signal generating circuit for generating a three-phase reference voltage signal for AC voltage to be transmitted from said cyclo-converter circuit;

a three-phase switching signal generating circuit for generating control signals for controlling said cyclo-converter circuit in response to a three-phase reference voltage signal generated by said reference voltage signal generating circuit, and the carrier signal generated by said carrier signal generator.

* * * * *